United States Patent [19]

Geyer

[11] Patent Number: 4,475,179
[45] Date of Patent: Oct. 2, 1984

[54] OPTICAL DISC WRITE/READ METHODS AND APPARATUS WITH IMPROVED FOCUS AND TRACKING CONTROL

[75] Inventor: Frederick F. Geyer, Rochester, N.Y.

[73] Assignee: Eastman Kodak Company, Rochester, N.Y.

[21] Appl. No.: 394,003

[22] Filed: Jun. 30, 1982

[51] Int. Cl.³ .............................................. G11C 13/04
[52] U.S. Cl. ...................... 365/215; 369/45; 250/570
[58] Field of Search ............ 365/215; 369/45, 46, 369/122; 250/201, 202, 552, 570; 360/99

[56] References Cited

U.S. PATENT DOCUMENTS

| | | | |
|---|---|---|---|
| 3,673,412 | 6/1972 | Olson | 250/201 |
| 4,037,929 | 7/1977 | Bricot et al. | 350/160 |
| 4,051,529 | 9/1977 | Miyaoka | 358/128 |
| 4,124,273 | 11/1978 | Huignard et al. | 350/150 |
| 4,167,029 | 9/1979 | Ragle et al. | 360/99 |
| 4,193,091 | 3/1980 | Kleuters et al. | 369/45 |
| 4,337,531 | 6/1982 | Willemsen | 369/45 |
| 4,345,321 | 8/1982 | Arquie et al. | 369/122 |
| 4,385,373 | 5/1983 | Howe | 369/45 |

*Primary Examiner*—Stuart N. Hecker
*Attorney, Agent, or Firm*—Warren W. Kurz

[57] ABSTRACT

Spot-focus of a write or read beam upon a flexible optical disc, which is rotated with its neutral plane highly stabilized in space, is maintained precisely by moving the write or read beam source (e.g. a laser diode) in response to focus error signals.

12 Claims, 6 Drawing Figures

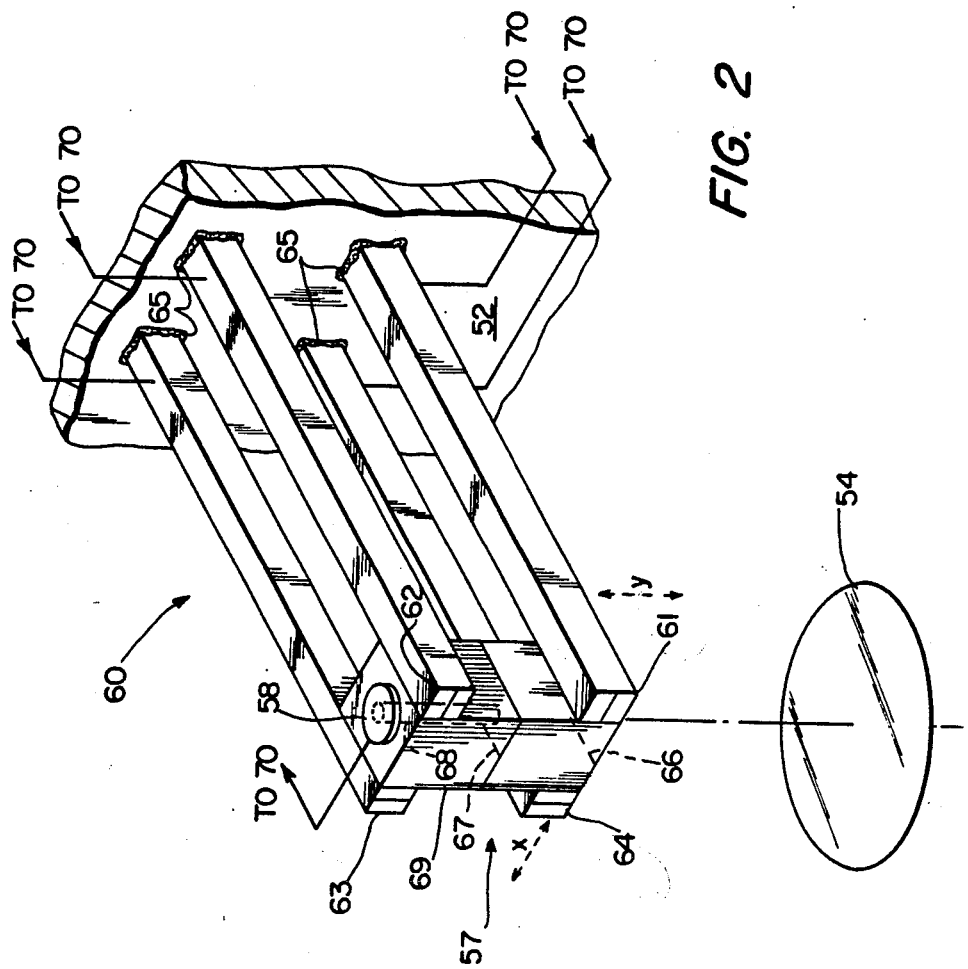

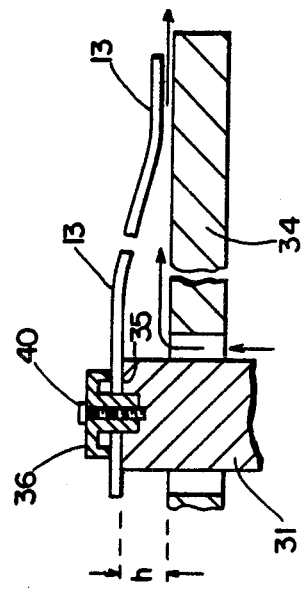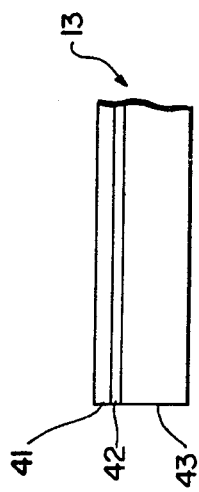

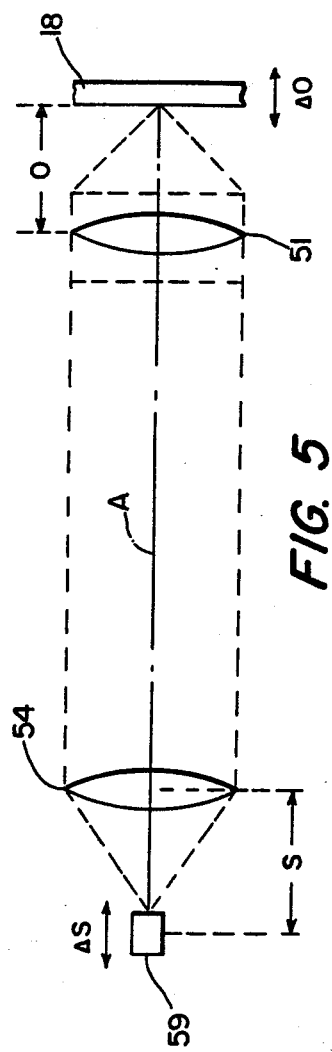
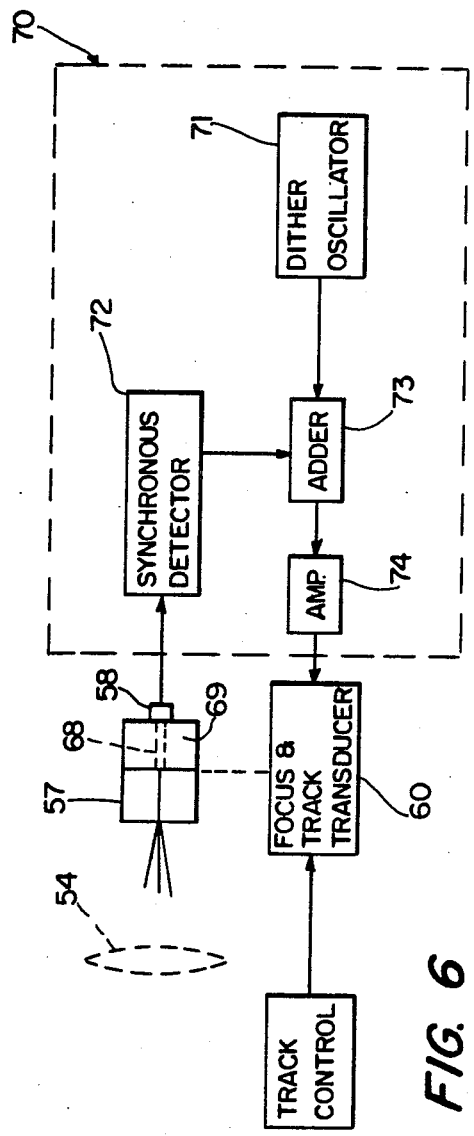
FIG. 5
FIG. 6

OPTICAL DISC WRITE/READ METHODS AND APPARATUS WITH IMPROVED FOCUS AND TRACKING CONTROL

BACKGROUND OF THE INVENTION

1. Field of the Invention

The present invention relates to methods and apparatus for optically writing and/or reading information on optical discs and more specifically to improvements whereby focus and tracking of a write/read light spot on the information surface of the optical disc is controlled by adjusting movements of the write/read light source.

2. Description of the Prior Art

The currently preferred optical disc technology employs disc elements with spiral or concentric tracks of minute (usually on the order of a micron or less in size), optically-detectable marks. One real-time mode of recording (writing) such marks is by scanning the disc with a small focused spot of radiation (e.g., from a laser) which is modulated "off or on" according to an electrical signal representative of the information to be written. Information is recovered (read) by scanning the tracks with an unmodulated, equivalently small, tightly focused light spot. The recovered information is in the form of a fluctuating electrical signal obtained from a photodetector that senses the modulated read-out light reflected from the recorded disc.

In order to write and read information in the form of such minute markings, optical systems of relatively high numerical aperture (e.g. N.A.>0.3) are used to focus light to equivalently minute spots. Such optical systems have extremely small depths of focus and the maintenance of proper spot-focus on the disc surface is difficult.

One approach has been to utilize highly-precise turntables for supporting and rotating the optical discs in a predetermined plane. Such apparatus is expensive, but even with such costly turntables it is usually necessary also to provide complex focus-servo devices which effect lens adjustment in response to minute variations in the position of the record surface of the optical disc relative to the focusing lens. Such record surface variations are caused by thickness variations and non-flatness of the disc or turntable surface or apparatus vibrations. Since the discs rotate at high speeds (e.g., 1800 RPM), these focus-servo devices must respond at high frequencies (e.g., 500 Hz. for discs with ground glass substrates and in the range of 1000 to 3000 Hz. for discs with molded plastic substrates). The high numerical aperture lenses present a relatively large mass that presents additional difficulty in effecting requisite focusing accelerations and decelerations of the lens. Therefore these focus-servo devices are also costly, and fragile. U.S. Pat. No. 4,193,091 discloses one example of such a focus control system wherein error signals to dictate adjusting movements of the focusing lens are provided by a focus detection system including a light source which oscillates at a predetermined frequency.

One approach for avoiding adjusting movement of the focusing lens element is described in U.S. Pat. Nos. 3,673,412 and 4,051,529. In the focus control systems of these patents, the image conjugate of the focusing lens is adjusted by means of a movable mirror, which forms a part of the optical path and is adjusted along the optical axis in response to focus error signals. These systems introduce additional optical elements along the light path, which present additional alignment difficulties and decrease the light power available at the disc surface. Such power decrease is undesirable, particularaly for recording at high speeds where the availability of power is quite critical. U.S. Pat. Nos. 4,037,929 and 4,124,273 disclose similar approaches, using electro-optic modulators, for adjusting the image conjugate of the focusing lens to effect focus control. These systems likewise introduce optical inefficiencies and resultant decreases in the recording power available at the recording surface.

U.S. application Ser. No. 160,769, entitled "Improved Optical Disc Method, Media and Apparatus for Writing and/or Reading Information", filed June 18, 1980, in the names of Geyer and Howe provides an alternative approach to the focus control problem. The Geyer and Howe approach flys flexible optical discs, in a dynamically stabilized condition, specifically avoiding localized constraint structures which force the disc to any predetermined position relative to the working lens means. This technique substantially stabilizes the flying disc's neutral plane (the plane within a disc along which material is neither compressed nor extended during bending) in a plane of rotational equilibrium with an unexpected degree of precision, which dramatically reduces focus control requirements. However, some focus imprecisions still exist, e.g. to the extent of thickness variations in the disc.

I have found, however, that with the decreased variation in record surface position (e.g. $\leq \pm 5\mu$) existing in the Geyer and Howe flying flexible disc system, a different and highly advantageous focus control technique can be utilized with excellent results.

SUMMARY OF THE INVENTION

It is one significant purpose of the present invention to provide simple and optically efficient apparatus and procedures for maintaining focus control in optical write/read systems of the kind using a high numerical aperture focusing lens. An important advantage of the present invention is that it provides focus control by moving a low mass light source rather than by moving the more massive focusing lens. The term "light source" as used herein refers to, and means, the effective emission source from which photons originally diverge. A further advantage of the present invention is that it introduces no additional optical elements to reduce write and/or read power at the record surface. Another useful aspect of the present invention is that tracking adjustments can be implemented in simple and advantageous cooperation with its focus control approach.

In one aspect the present invention comprises apparatus for optically writing or reading high-density information on a record disc including a record layer on a generally flat, flexible support of generally uniform thickness. Such apparatus includes means for rotating the disc with its neutral plane substantially stabilized in space; a light source and focusing lens of high numerical aperture for directing a light beam into precise spot-focus on the disc recording layer; means for signalling focus error of the light beam upon the record surface; and means for moving the light source along the optical axis of the focusing lens in response to focus error signals.

In a highly preferred embodiment of the present invention the light source comprises a laser diode which is low-mass in comparison to the focusing lens assembly. Another preferred embodiment of the invention further comprises means for translating the light source and its moving means in a direction perpendicular to the optical axis to effect tracking control. In further aspects the invention comprises disc-apparatus systems and methods for effecting such focus and tracking control.

BRIEF DESCRIPTION OF THE DRAWINGS

The subsequent description of preferred embodiments of the invention refers to the attached drawings wherein:

FIG. 2 is an enlarged perspective view of a portion of the FIG. 1 apparatus;

FIG. 3 is an enlarged cross-sectional view of another portion of the apparatus shown in FIG. 1;

FIG. 4 is a cross-section of one exemplary optical disc useful in accord with the present invention;

FIG. 5 is an optical diagram of one embodiment of the present invention; and

FIG. 6 is a block diagram of one embodiment of focus detection and control system in accord with the present invention.

DETAILED DESCRIPTION OF THE PREFERRED EMBODIMENTS

Figure 1:
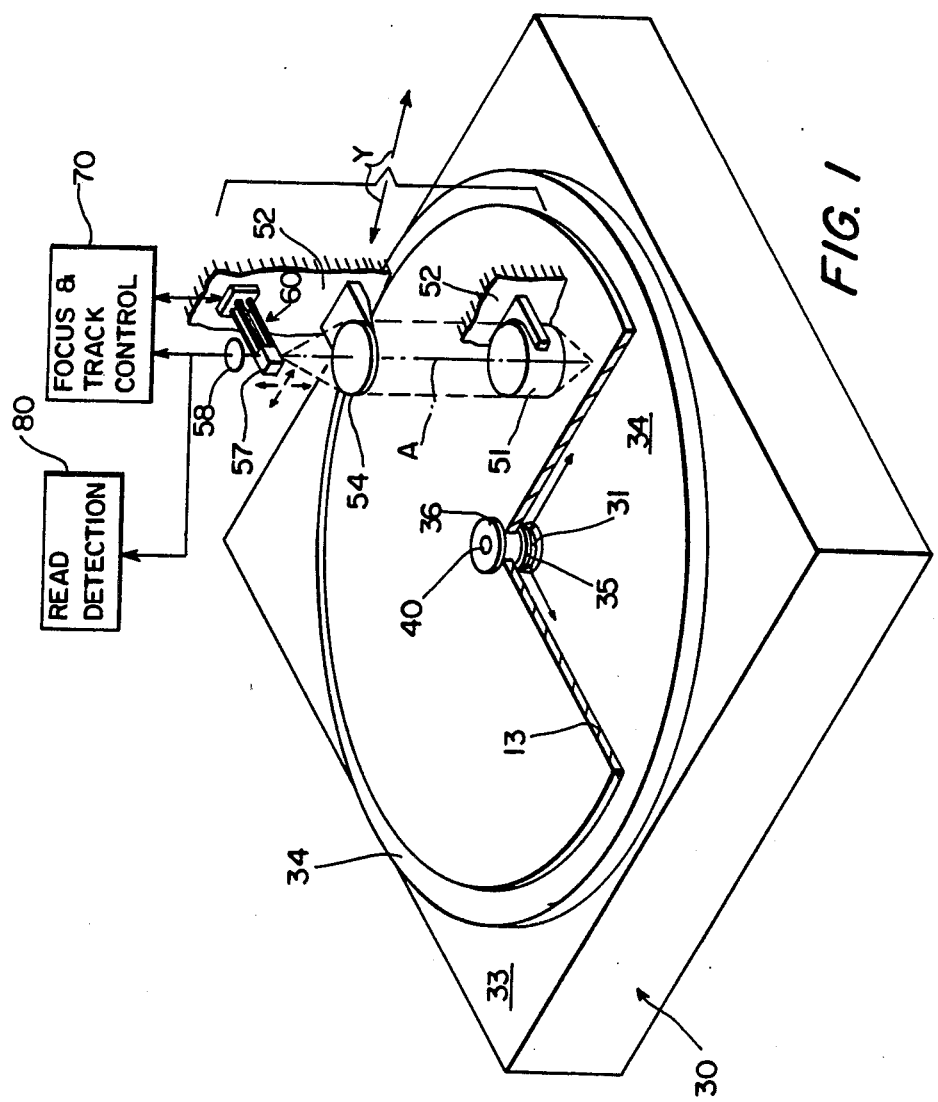
FIG. 1 is a schematic perspective view of one apparatus for practice of the present invention.

Referring now to FIGS. 1 and 3, there is illustrated one preferred embodiment for effecting precise stabilization of a flexible optical disc for practice of the present invention. Within the write/read apparatus housing 30 shown in FIG. 1, a rotatable drive shaft 31 is mounted with its rotational axis normal to the deck 33. The stabilizing reference surface 34 is adjustably supported on the deck 33 in concentric relation around shaft 31. The optical disc 13 is clamped by cap 36 to the top 35 of the drive shaft 31, which is located a predetermined height above the reference surface 34.

That is, the shaft 31 is coupled to a motor (not shown) which is adjustably supported to facilitate adjustment of the shaft axis to a condition generally normal to the deck 33, with its top surface 35 at a predetermined height above stabilizing reference surface 34. The top surface 35 is precisely machined to assure it is normal to the shaft axis of rotation. In accordance with a highly preferred mode, the disc-aligning portion of this surface has a variation of less than ±0.2 milliradians from the plane normal to the axis of rotation, when measured by rotating the shaft by hand. Adjustable elements (not shown) are provided to assure reference surface 34 is precisely parallel to top surface 35 and precisely normal to the axis of rotation of shaft 31.

As shown best in FIG. 3, clamp 36 has a protruding annular clamping portion and a centering portion which is adapted to fit snugly in a recess in the top of shaft 31. A precisely centered and sized aperture in disc 13 thus can cooperate with the centering portion of clamp 36 so as to precisely radially align the disc center with the axis of shaft rotation. When clamp 36 is in place in the shaft recess and secured, e.g. by a bolt 40, the annular clamping portions around its periphery secure the underlying portions of the disc in precise parallel relation to the shaft top 35 and thus the top of reference surface 34. Additionally, this peripheral clamping isolates the exterior peripheral portions of the disc 13 from any stresses created by the formation of its central aperture. It is also highly preferred that peripheries of clamp 36 and shaft 31 have a variation not exceeding ±0.0001" with respect to their radial distance from this axis of rotation. This is important so that the engagement zone with the disc is axially symmetrical and will initiate uniform stresses within the disc. It also is highly preferred that the shaft have at least a predetermined minimum diameter, in relation to a given diameter disc, so that the disc is not excessively stressed, either in the radial or tangential directions during rotation. For a 12" disc rotating at 1800 RPM, a shaft diameter of 1⅛" is highly useful.

It will be noted that the central aperture in reference surface 34 exceeds the diameter of shaft 31 so as to leave an annular air passage from the atmosphere to the radially central region of the zone area between disc 13 and reference surface 34. In accord with the illustrated configuration, an annular passage between a 1⅛" outer diameter shaft 31 and an inner diameter opening of 1¼" in reference surface 34 is highly useful. However, the size of this opening can vary so long as air is not so severely throttled as to cause contact between the disc and reference surface, during rotation, and the air flow into the gap is quiet (i.e., not turbulent). It is preferred that the annular passage communicate freely with ambient atmosphere via the space beneath the reference surface and the interior of housing 30.

Before proceeding to a description of how the apparatus shown in FIGS. 1 and 3 rotates disc 13 for writing and reading, it is appropriate to describe features of the disc 13 itself in more detail, for certain disc features are important. FIG. 4 shows, in cross-section, a portion of one useful disc 13 and the disc embodiment there illustrated can be seen to comprise a record layer 41 overlying a reflective surface 42 on a support 43. One preferred detection mode is for light to be reflected back from the record and reflective layers 41, 42 to the detector and therefore it is preferred that record layer 41 be transparent to read light (and absorptive to write light). Alternatively the record layer can be absorptive to both write and read light.

For proper rotational stabilization of the disc's neutral plane, it is important that optical discs have good flatness and thickness. It is also highly preferred that the disc have a smooth, substantially cylindrical periphery which is radially symmetric to its centering aperture.

With respect to flatness, it is highly desirable that the support, and disc itself have extremely little curl and core set. As a test for a preferred support material, a thin, e.g. 4 mil, 12" diameter disc element formed of the proposed material should be placed on a planar surface in an unconstrained condition. It is preferred that no peripheral or central portion of the disc element raise more than about 1/32" from the planar surface. It is highly preferred that such element have no portion that raises more than about 1/64" in such test. One preferred material which has been found to have such substantially-flat characteristic is an Estar polyethylene terephthalate film base which is extruded and biaxially oriented and commercially marketed as the photoconductor support of the Kodak Ektaprint L Image Loop. It is to be understood, however, that useful results can be obtained with more generally flat support materials, not meeting the above, preferred criterion. For example, good stabilization of discs over useful annular portions thereof have been attained with disc supports having peripheral curl of ¼" or even ½".

With respect to uniformity of thickness, it is preferred that the disc support, and the disc itself, have a thickness variation of about ±2.5µ or less. The Estar film support identified above also meets this defined characteristic.

Again, it is to be understood that support materials of more generally uniform thickness may be useful in certain applications in accordance with the present invention. For example, where depth of focus is less critical such as in some read-only applications, useful materials could have thickness variations in excess of the defined criterion.

Having described the useful and preferred disc characteristics, the preferred structure and mode for rotating the disc with its neutral plane in a highly stabilized condition will be explained. In general, it is extremely important, for optimal practice of the invention, that the stabilizing reference surface 34 be properly configured and that the height of the top surface 35 of shaft 31 (and thus the disc's orientation plane) be properly positioned relative to reference surface 34.

More specifically, the preferred reference surface configuration has three important characteristics. First, it should be aerodynamically smooth and featureless. That characteristic of "featureless" denotes a continuous surface in distinction to prior art techniques in which grooves, apertures or sensors were incorporated in the surface. Turned and polished metal surfaces or chrome plated surfaces have been found to be preferred from the smoothness viewpoint. Second, it is preferred that the reference surface be radially symmetric with respect to the axis of rotation of shaft 31 and non-convex with respect to the plane of the shaft top 35 (i.e., the plane of disc orientation). The planar surface provided by the annular reference member 34 in the illustrated embodiment of course meets this requirement. However, it may be preferred to modify the surface configuration of reference member 34 to make it symmetrically concave, e.g., as a surface of revolution defined by a curve sloping upwardly from the central axis to the periphery. Such modifications can be useful to cause the stabilized condition of the rotating disc to be more planar in nature. In regard to symmetry, we have found it to be highly preferred that, at given radii, the reference surface have less than 1 mil (most preferably ±0.5 mil) variation in height from a plane normal to the axis of rotation of shaft 31. Finally, the periphery of the reference surface should extend at least to the periphery of the disc. That is, it should not terminate substantially radially inwardly from the disc periphery or air turbulence will occur, disrupting any effective stabilization of the rotating disc.

As mentioned above, the height of the reference surface 34 in relation to the top surface 35 of shaft 31 is also important. The preferred limits for the variation of this distance ("h" in FIG. 3) can best be described functionally in regard to the certain peripheral conditions created between the disc and reference surface during disc rotation. That is, the maximum preferred distance for height h is one which; when the disc is rotating at its nominal speed, just avoids the condition of excessive turbulence at the disc periphery. For a disc having a 0.004" thickness and a 12" diameter, rotating at 1800 RPM over a planar reference surface, such as shown in the drawings, this maximum height "h" occurs at about 0.015".

The minimum for the height h is a function of particles which are present in air and that it should in no event be less than as to maintain a peripheral air gap of about 0.001" between the disc and reference surface. Smaller peripheral gaps have two compounding adverse effects which prevent any effective stabilization. First, dust particles of 0.001" will become caught in the passage and disturb the laminar nature of the air flow. Second, even if particles are not "caught" to an extent blocking air passage, they forcefully impact the too closely opposing surfaces causing a build up of electrostatic charges. Such charges have been recognized in the art as a significant deterrent to stabilized disc flight.

Another problem creating electrostatic disturbing forces can occur during the start of disc rotation, i.e., its take-off. At this stage there is inherently a frictional rubbing between the disc and the reference surface. The extent of this effect can be lessened to some extent by reference surface configuration (e.g., making it concave) and by choice of material (i.e., a chrome-coated reference surface exhibits a good position in the triboelectric series relative to plastic supports). It is useful to provide a quick disc take-off, e.g., preferredly effected by use of a high torque motor and relative lightweight construction of the moving parts. Alternatively peripheral lifter elements, e.g., solenoids, might be used; however, these should be precisely constructed and quickly retracted after disc take-off, to a condition leaving the reference surface featureless. Other techniques, e.g. air injection or different disc-stabilizing surface orientations can be utilized to avoid disc contact during the initiation of rotation.

The nominal disc rotational rate can be selected for the signal format but should be sufficiently high so that dynamic forces straighten the disc to the modified planar condition above the reference surface. The air supply to the central region is preferredly at atmospheric pressure, but we have found that good stabilization can be obtained with slightly negative pressure sources. However, the pressure source should not be significantly positive with respect to atmospheric. It is preferable that the air introduction means provide uniform flow along its circumference, thus the annular opening between the shaft and reference surface is preferred.

Thus, if a properly configured disc is properly supported for rotation and if this outward movement of air is highly uniform in all radial directions, a highly stabilized equilibrium condition can be attained between the dynamic, elastic, fluid and gravitational forces acting on the disc. This results in a remarkable stabilization in vertical displacement of a large annular portion of the disc as described in more detail in the aforementioned Geyer and Howe U.S. application Ser. No. 160,769 which is incorporated herein by reference. With the flexible optical disc so rotating with its neutral plane stabilized in a plane of rotational equilibrium, the improvements of the present invention are implemented as described below with reference to FIGS. 1, 2, 5 and 6.

The write/read optical system shown in FIG. 1 in general includes a high numerical aperture (N.A.) focusing lens 51 supported by mounting means 52 at a generally fixed distance, along optical axis A, from a rotated disc 13. Likewise fixedly supported along axis A by mounting means 52 are collimating lens 54 and a moving means 60 (described subsequently in more detail) for light source 57, which preferably is a diode laser. Photodetector 58 is positioned to receive rear facet emission from diode laser 57 and provides outputs to focus and control circuit 70 and detection circuit 80.

Mounting means 52 is adapted to move radially with respect to disc 13 (as indicated by arrows r in FIG. 1) for positioning the optical axis A at different concentric or spiral track positions on disc 13. Preferably mounting means 52 also is adapted to maintain a "generally-constant" spacing between disc 13 and focusing lens 51. For example, the radial movement path of the mounting means can incorporate a gross adjustment of the spacing between reference surface 34 and lens 51 to compensate for the different heights (above the reference surface) at which different radial regions of the disc fly.

The optical mechanisms of the present invention's focus adjustment approach can be understood more easily by reference to FIG. 5. As shown, collimating lens 54 is nominally located at its focal length S from the source and focusing lens 51 is nominally located at its focal length O from the record layer of disc 13. The approach for adjusting focus is to move source 57 along the optical axis A (toward or away from focusing lens 51) an amount $\Delta S$ which adjusts the angle of divergence (or convergence) of light passing to lens 51 by an amount which will correct for a shift $\Delta O$ of the disc record layer surface with respect to the generally-fixed focusing lens 51.

More specifically, it can be shown that where $\Delta S/S << $ than $1/M$ (M being the magnification factor O/S), the adjustment $\Delta S$ to compensate for a shift of the record surface $\Delta O$ is approximately $\Delta O/M^2$. From the foregoing it can be seen that the approach of focus correction shown in FIG. 1 is highly suitable for use with optical systems having magnitications (M) in the order of 0.5 to 1.0 and optical discs that are aerodynamically stabilized (as described above) with shifts $\Delta O$ in the order of $<\pm 6\mu$. For example by computer ray tracings, I have noted that with a 0.85 NA focusing lens and 0.5 NA collection lens, a $20\mu$ range of adjustment exists before the geometric spot dictated by aberration in the optical system (introduced by not working at the design conjugates of the lens system) become comparable with the physical spot size dictated by scalar diffraction.

One preferred construction for moving means 60 is shown in more detail in FIG. 2. In this embodiment, moving means 60 comprises four piezoelectric bender elements 61, 62, 63 and 64 each affixed in cantilever fashion at one end by a compliant adhesive 65 to support 52. The bender elements are each couplable to control 70 for selective activation by a voltage source (not specifically shown). The bender elements 61, 62 are constructed and oriented to provide (when actuated) movements of the source 57 in the y directions for focus adjustment and bender elements 63, 64 are oriented to provide (when actuated) movements of source 57 in the x directions for tracking adjustment.

FIG. 2 also shows more clearly one preferred construction for source 57 and detector 58 in accord with the present invention. Diode laser 57 is oriented with its front facet 66 located to emit light on optical axis A and its rear facet 67 located to provide rear facet emission to fiber optic bundle 68, which passes through heat sink 69 to the photoelectric detector 58, mounted on the heat sink. During focus adjustment, control 70 receives a signal from detector 58 and provides an electrical signal to bender elements 61, 62 which locate light source 57 along axis A so that lens 51 is in precise spot-focus on the disc record layer.

FIG. 6 illustrates one exemplary circuit by which control 70 can provide continuous focus adjustment with the FIG. 2 configuration. In this embodiment the bender elements 61, 62 of moving means 60 are continuously dithered (in response to a signal from oscillator 71) to move source 57 back and forth within a range causing the region of precise spot-focus of lens 51 to undergo excursions between locations in front of and behind the record layer of disc 13. The amplitude of the light reflected from the disc record layer is proportional to the preciseness of spot-focus on the record layer. The rear facet emission of diode laser 57 triggered by reflected light varies in synchronism with the amplitude of light reflected from the disc, causing a corresponding variable amplitude signal from detector 58. The electrical signal from detector 58 is input to synchronous detector 72 whose output is added by circuit 73 to the continuous dither signal from oscillator 71. The output signal from synchronous detector 72 provides directional information (i.e. forward or backward) based on the phase of its input signal, as well as information regarding the magnitude of the required adjustment. Amplifier circuit 74 proportions the correction signal to provide voltages to bender elements that will effect the proper forward or rearward shift of source 57 (and thus focus correction of the beam from focusing lens 51).

FIGS. 2 and 6 also illustrate another highly useful aspect of the present invention. As mentioned above, piezoelectric benders 63, 64 are adapted to shift source 57 (and detector 58) in a direction (x) perpendicular to the optical axis A. In response to tracking correction signals, track control circuit 80 (which can be one of various types known in the art) provides voltages to bender elements 63, 64 that cause source 57 to shift laterally, within the field of view of focus lens 51, to effect tracking adjustments. The track corrections of the illustrated embodiment are for radial tracking; however, it will be appreciated by one skilled in the art that by appropriate re-orientation of the moving means 60, tangential tracking adjustments can be effected in simple cooperation with the focus adjustments.

The invention has been described in detail with particular reference to preferred embodiments thereof, but it will be understood that variations and modifications can be effected within the spirit and scope of the invention.

What is claimed is:

1. Apparatus for optically writing or reading high-density information on a record disc including a record layer on a flexible support which is generally flat and of generally uniform thickness, said apparatus comprising:
   (a) means for rotationally flying such disc with its neutral plane substantially stabilized in space;
   (b) means, including a light source of original photon divergence and a focusing lens of high numerical aperture, for directing a light beam into precise spot-focus on the record layer of said disc;
   (c) means for sensing and signalling error in spot-focus of said light beam upon said record surface; and
   (d) means, responsive to said signalling means, for moving said light source toward and away from said focusing lens by amounts that correct for such spot-focus error.

2. Apparatus for optically writing or reading high-density information on a record disc of the type including a record layer on a flexible support which is generally flat and of generally uniform thickness, said apparatus comprising:
   (a) means for rotating such disc at a high speed and for substantially stabilizing the neutral plane of operative disc portions in space;
   (b) focusing lens means of high numerical aperture mounted with respect to said rotating and stabilizing means so that its focal point is generally at the record layer of such rotating disc;

(c) collimating lens means mounted along the optical axis of said focusing lens means;

(d) a light source of original photon divergence for writing or reading mounted for movement along said optical axis, toward and away from said focusing lens means, within an adjustment zone encompassing the focal point of said collimating lens means;

(e) means for sensing and signalling spatial deviations between the focal point of said focusing lens means and the record layer of a rotating disc; and (f) means, responsive to said sensing and signalling means, for moving said light source within said adjustment zone, toward and away from said focusing lens means, to reduce such spatial deviations by amounts effecting precise spot-focus of said light on said record layer.

3. The invention defined in claim 2 wherein said light source is a low-mass, solid-state light emitter.

4. The invention defined in claim 2 wherein said light source is a diode laser.

5. The invention defined in claim 2, 3 or 4 wherein said moving means includes piezoelectric bender means.

6. The invention defined in claim 2, 3 or 4 wherein said sensing and signalling means includes dither means for signalling oscillating movements of said light source along said optical axis.

7. The invention defined in claim 2, 3 or 4 wherein said sensing and signalling means includes dither means for signalling oscillating movements of said light source along said optical axis, photoelectric detection means for sensing and signalling the magnitude and direction of such spatial deviations and means for signalling an adjustment of the oscillation midpoint of said light source to reduce said spatial deviations.

8. In apparatus adapted for optically writing and/or reading high-density information and including:

(1) a record disc including a recording layer on a flexible support which is substantially flat and of substantially uniform thickness;

(2) rotatable means for positioning such record disc in centered relation to a rotational axis and for engaging and retaining a central portion of the disc in a plane precisely normal to the rotational axis;

(3) stationary means defining a highly smooth, featureless, stabilizing reference surface that is axially symmetric to said rotational axis and non-convex to said normal plane;

(4) means for rotating said rotatable means at a high speed which flys the outer portion of an engaged disc in closely spaced relation to said stabilizing surface;

(5) means for coupling a radially central region of the zone between said stabilizing reference and an engaged disc to a gas source not substantially exceeding the ambient pressure external of said zone; and (6) write or read means including a light source of original photon divergence and a focusing lens of high numerical aperture for directing a beam of light into precise spot-focus on the record layer of said disc, the improvement wherein said write or read means includes:

(a) means for continuously sensing and signalling deviations from precise spot-focus of said light beam upon said record surface; and (b) means for moving said light source toward and away from said focusing lens, in response to said signalling means, by amounts which maintain precise spot-focus of said light beam on said record surface.

9. In apparatus adapted for optically recording high-density information on a record disc, including an optical recording layer on a substantially flat, flexible disc support of substantially uniform thickness, which apparatus includes:

(1) rotatable means for positioning such record disc in centered relation to a rotational axis and for engaging and retaining a central portion of the disc in a plane precisely normal to the rotational axis;

(2) stationary means defining a highly smooth, featureless, stabilizing reference surface that is axially symmetric to said rotational axis and non-convex to said normal plane;

(3) means for rotating said rotatable means at a high speed which flys the outer portion of an engaged disc in closely spaced relation to said stabilizing surface;

(4) means for coupling a radially central region of the zone between said stabilizing reference and an engaged disc to a gas source not substantially exceeding the ambient pressure external of said zone; and (5) means, including a light source of original photon divergence and a focusing lens of high numerical aperture, for directing a recording light beam into precise spot-focus on the record layer of said disc, the improvement wherein said light directing means comprises:

(a) means for continuously sensing and signalling spot-focus error of said light beam upon said record surface; and (b) means for moving said light source toward and away from focusing lens, in response to said signalling means, by amounts which correct for such spot-focus error.

10. The invention defined in claim 1, 2, 8, or 9 further comprising means for translating said light source and said moving means in a direction generally perpendicular to said optical axis.

11. The invention defined in claim 10 further comprising means for sensing tracking error of light focused on said record layer and for signalling said translating means to correct said tracking error.

12. In a method of optically writing and/or reading high-density information comprising:

(1) positioning a flexible record disc which is generally flat and of generally uniform thickness with its central portion constrained in a plane substantially normal to an axis of rotation and with its outer portion closely adjacent a highly smooth, featureless stabilizing reference surface that is axially symmetric to said axis of rotation and generally non-convex to the plane of said disc central portion constraint;

(2) maintaining said reference surface stationary while rotating said central disc portion in said plane and about said axis at a high speed which flys said disc outer portion in closely spaced opposing relation to said stabilizing reference surface;

(3) coupling a radially central region of the zone between said disc and said stabilizing reference surface to a gas source of pressure not substantially exceeding the ambient pressure external of said zone; and (4) directing a beam of writing or reading light from a source of original photon divergence, through a focusing lens of high numerical aperture and into precise focus on a record surface of said rotating disc, the improvement wherein said beam directing step includes:

(a) continuously sensing and signalling deviations from precise spot-focus of said light beam on said record surface; and (b) moving said light source toward and away from focusing lens, in response to said signalling, by amounts which maintain such precise spot-focus of said light beam on the record surface.

* * * * *